(12) United States Patent
Seder et al.

(10) Patent No.: US 10,318,043 B2
(45) Date of Patent: Jun. 11, 2019

(54) DYNAMIC ADJUSTMENT OF TOUCH SENSITIVE AREA IN A DISPLAY ASSEMBLY

(71) Applicant: GM GLOBAL TECHNOLOGY OPERATIONS LLC, Detroit, MI (US)

(72) Inventors: Thomas A. Seder, Warren, MI (US); James A. Carpenter, Rochester Hills, MI (US); Reno V. Ramsey, Sterling Heights, MI (US); William E. Conway, Birmingham, MI (US); Davide Silvestri, Macomb, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 507 days.

(21) Appl. No.: 15/080,076

(22) Filed: Mar. 24, 2016

(65) Prior Publication Data

US 2017/0277332 A1 Sep. 28, 2017

(51) Int. Cl.
  *G09G 3/36* (2006.01)
  *G09G 5/00* (2006.01)
  *G06F 3/041* (2006.01)

(52) U.S. Cl.
  CPC .......... *G06F 3/0416* (2013.01); *G09G 5/00* (2013.01); *G09G 3/3648* (2013.01); *G09G 2320/028* (2013.01); *G09G 2320/068* (2013.01); *G09G 2320/08* (2013.01); *G09G 2340/0464* (2013.01); *G09G 2354/00* (2013.01); *G09G 2380/10* (2013.01)

(58) Field of Classification Search
  None
  See application file for complete search history.

(56) References Cited

U.S. PATENT DOCUMENTS

| 5,565,894 | A | 10/1996 | Bates et al. |
| 7,855,779 | B2 | 12/2010 | Nozawa |
| 8,456,445 | B2 | 6/2013 | De Mers et al. |
| 9,047,002 | B2 * | 6/2015 | Bathiche ............... G06F 3/0488 |
| 9,247,684 | B2 * | 1/2016 | Ikeda ................. H05K 13/0015 |

(Continued)

FOREIGN PATENT DOCUMENTS

| EP | 0324306 A2 | 7/1989 |
| JP | 2009032027 A | 2/2009 |
| WO | 2010020961 A1 | 2/2010 |

*Primary Examiner* — William Boddie
*Assistant Examiner* — Bipin Gyawali
(74) *Attorney, Agent, or Firm* — Quinn IP Law

(57) ABSTRACT

A display assembly includes a display console having an image plane spaced from a touch plane. The touch plane includes at least one touch sensitive area. A controller is operatively connected to the display console, and includes a processor and tangible, non-transitory memory on which is recorded instructions for executing a method of dynamically adjusting at least one touch sensitive area in real-time. The controller may be programmed to determine respective correction shifts to each pixel in the touch sensitive area for multiple viewing positions of one or more users. The display console may be curved. The controller may be programmed to simultaneously a first correction shift to a first touch sensitive area for the viewing position of the first user and a second correction shift to a second touch sensitive area for the viewing position of the second user.

16 Claims, 3 Drawing Sheets

(56) References Cited

U.S. PATENT DOCUMENTS

| | | | |
|---|---|---|---|
| 2006/0092096 A1* | 5/2006 | Sakashita | G09G 3/002 345/1.3 |
| 2006/0279552 A1* | 12/2006 | Tonouchi | G06F 1/1613 345/173 |
| 2009/0116108 A1* | 5/2009 | Levecq | G02B 27/2214 359/463 |
| 2011/0285657 A1* | 11/2011 | Shimotani | G06F 3/0416 345/173 |
| 2012/0032896 A1 | 2/2012 | Vesely et al. | |
| 2012/0036433 A1* | 2/2012 | Zimmer | G06T 15/20 715/702 |
| 2014/0090505 A1* | 4/2014 | Okuyama | G06F 3/0219 74/485 |
| 2014/0118291 A1* | 5/2014 | Fujii | G06F 3/0418 345/174 |
| 2014/0267178 A1* | 9/2014 | Bathiche | G06F 3/0488 345/178 |
| 2015/0138163 A1* | 5/2015 | Baldwin | G06F 3/0488 345/178 |
| 2015/0375680 A1* | 12/2015 | Watanabe | B60R 1/00 701/36 |
| 2017/0249718 A1* | 8/2017 | Wunderlich | B60W 50/10 |
| 2018/0227542 A1* | 8/2018 | Qi | H04N 7/144 |

\* cited by examiner

DYNAMIC ADJUSTMENT OF TOUCH SENSITIVE AREA IN A DISPLAY ASSEMBLY

TECHNICAL FIELD

The disclosure relates generally to a display assembly, and more particularly, to dynamic adjustment of a touch sensitive area in the display assembly.

BACKGROUND

Many devices include touch screen displays where a user touches a touch-sensitive portion of the display to activate an application or perform a selection. Due to a host of issues, including but not limited to, parallax, movement of the user, curvature of the display and rotation of the display, misalignment may occur between the touch sensitive portion of the display as seen by a viewer and the touch sensitive portion determined by the display system.

SUMMARY

A display assembly includes a display console having an image plane and a touch plane. The touch plane is spaced a separation distance ($z_1$) from the image plane. The touch plane includes at least one touch sensitive area, such as a first touch sensitive area divided into a first plurality of pixels. A controller is operatively connected to the display console. The controller including a processor and tangible, non-transitory memory on which is recorded instructions for executing a method of dynamically adjusting at least one touch sensitive area in real-time. The controller may be programmed to determine respective correction shifts to each of the first plurality of pixels of the first touch sensitive area for multiple viewing positions of at least one user (such as a first user and a second user).

A proximity sensing system may be operatively connected to the controller and includes a first sensor. The first sensor may be configured to detect when one of the first user and the second user is at least partially within a first predefined distance of the first touch sensitive area. If the first sensor detects the first user being at least partially within the first predefined distance of the first touch sensitive area at a time j, then the controller is programmed to apply the respective correction shifts to each of the first plurality of pixels for a viewing position of the first user at the time j.

If the first sensor detects the second user being at least partially within the first predefined distance of the first touch sensitive area at a time k, then the controller is programmed to apply the respective correction shifts to each of the first plurality of pixels for a viewing position of the second user at the time k. The touch sensitive area may include a second touch sensitive area divided into a second plurality of pixels. The proximity sensing system may further include a second sensor configured to detect when another of the first user and the second user is at least partially within a second predefined distance of the second touch sensitive area.

If the first sensor indicates the one of the first user and the second user is at least partially within the first predefined distance of the first touch sensitive area at a time m and the second sensor indicates the another of the first user and the second user is at least partially within the second predefined distance of the second touch sensitive area at the time m, then the controller is programmed to apply simultaneously a first and a second correction shift at the time m. The first correction shift is applied to the first plurality of pixels of the first touch sensitive area for the viewing position of the first user at the time m and second correction shift is applied to the second plurality of pixels of the second touch sensitive area for the viewing position of the second user at the time m.

The touch plane defines a coordinate system with an origin, an x-axis, a y-axis and a z-axis, the x-axis and the y-axis defining an x-y plane. The controller may be programmed to obtain a correction matrix [$x_{pixel}$, $y_{pixel}$, $x_{pixel}$ offset, $y_{pixel}$ offset] such that each of the first plurality of pixels ($x_{pixel}$, $y_{pixel}$) is translated in the x-y plane by off-set values ($x_{pixel}$ offset, $y_{pixel}$ offset). The off-set values ($x_{pixel}$ offset, $y_{pixel}$ offset) are based at least partially on the separation distance ($z_1$), a viewing reference vector (R) between the origin and a first eye reference point of the first user, a first angle ($\theta$) and a second angle ($\varphi$). The second angle ($\varphi$) is between a normal vector perpendicular to the display console and the viewing reference vector (R).

The first angle ($\theta$) may be between the x-axis and an x-y projection vector ($r_{xy}$), the x-y projection vector ($r_{xy}$) being a projection of the viewing reference vector (R) on the x-y plane. Alternatively, such as where the display console has a curved profile, the first angle ($\theta$) may be defined between the x-axis and a tangent vector. The tangent vector is a projection of the viewing reference vector (R) on a plane that is tangent to the normal vector.

A seat position sensor may be operatively connected to the controller and configured to detect a seat position of the first user. The viewing reference vector (R), the first angle ($\theta$) and the second angle ($\varphi$) may be based at least partially on the seat position sensor. A camera may be operatively connected to the controller and configured to obtain the eye reference point of the first user in real-time. The viewing reference vector (R), the first angle ($\theta$) and the second angle ($\varphi$) are dynamically adjusted based at least partially on the first (or second) eye reference point in real-time.

An x-component of the off-set values ($x_{pixel}$ offset, $y_{pixel}$ offset) may be defined as $x_{pixel}$ offset=$z_1$*[cosine(90−$\varphi$)*cosine(180−$\theta$)]/[cosine($\varphi$)]. A y-component of the off-set values ($x_{pixel}$ offset, $y_{pixel}$ offset) may be defined as $y_{pixel}$ offset=$z_1$*[cosine (90−$\varphi$)*sine(180−$\theta$)]/[cosine($\varphi$)].

The display console may be rotated a tilt angle ($\alpha$) about a rotation axis such that an original position ($x_1$, $y_1$) on the touch plane is rotated to a modified position ($x_2$, $y_2$) relative to the origin. A y-coordinate ($y_2$) of the modified position ($x_2$, $y_2$) is a function of the original position ($x_1$, $y_1$) and the tilt angle ($\alpha$), such that $y_2$=($y_1$*cosine ($\alpha$)). The controller may be programmed to obtain a modified first angle ($\theta_2$) and a modified second angle ($\varphi_2$) to compensate for the tilt angle ($\alpha$).

The modified first angle ($\theta_2$) may be based at least partially on a modified projection ($r_{xy,2}$) and a radial distance (r) between the origin and the eye reference point of the first user, the modified first angle ($\theta_2$) being defined as [90−(cosine$^{-1}$ ($r_{xy,2}$/r))]. The modified second angle ($\varphi_2$) may be based at least partially on a modified projection ($r_{xy,2}$) and a modified y-coordinate ($y_2$), the modified second angle ($\varphi_2$) being defined as [180−(sine$^{-1}$ ($y_2$/($r_{xy,2}$)))]. The modified projection ($r_{xy,2}$) is a function of the original position ($x_1$, $y_1$) and the tilt angle ($\alpha$), such that $r_{xy,2}$=$(x_2+y_2)^{0.5}$.

The above features and advantages and other features and advantages of the present invention are readily apparent from the following detailed description of the best modes for carrying out the invention when taken in connection with the accompanying drawings.

DETAILED DESCRIPTION

Figure 1:
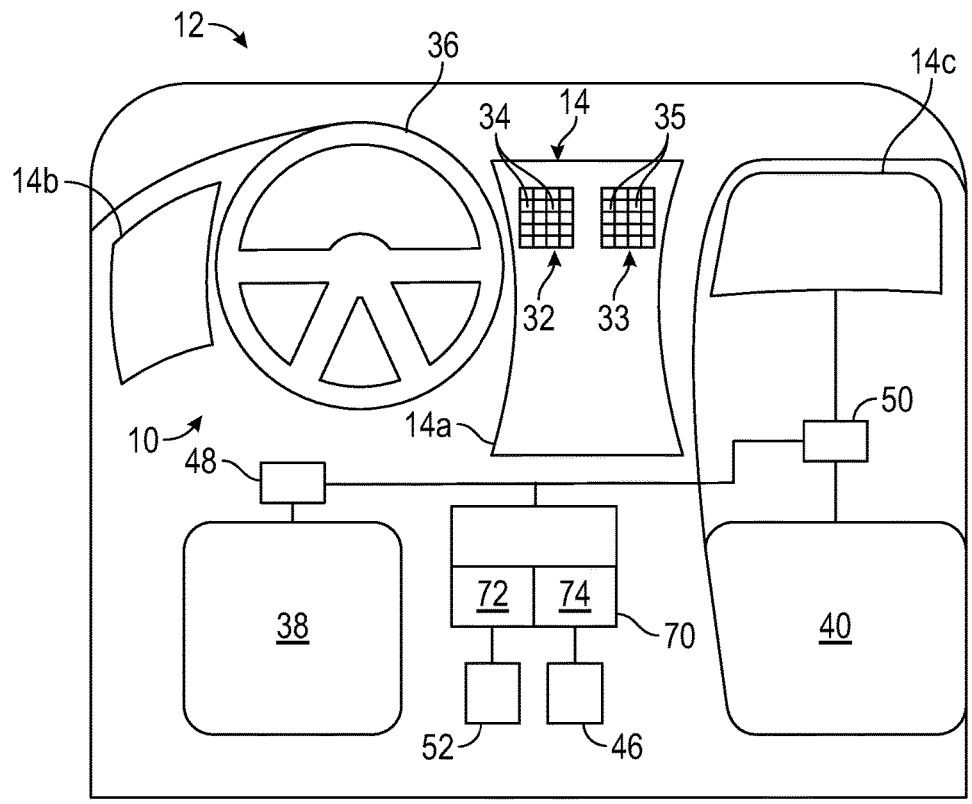
FIG. 1 is a schematic perspective fragmentary view of a display assembly having a display console and a controller.
Figure 2:
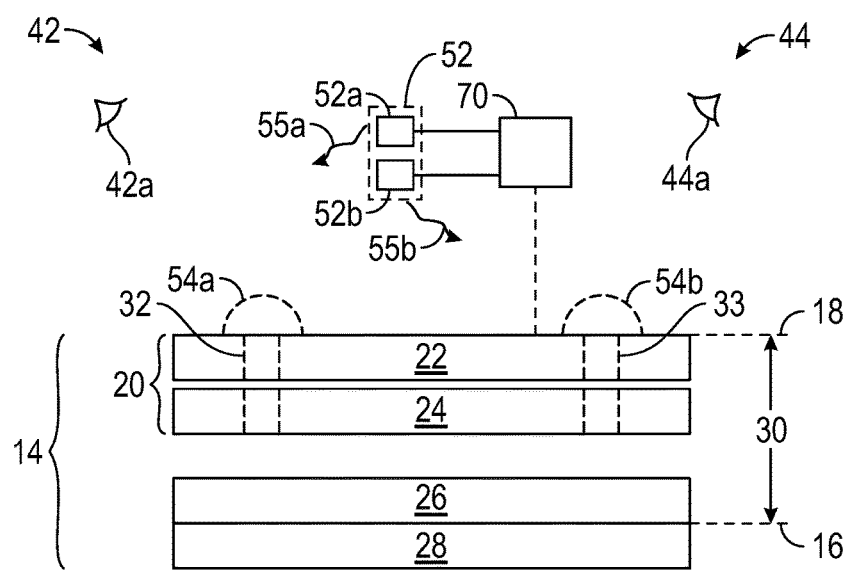
FIG. 2 is a schematic fragmentary partly-sectional view of the display console of FIG. 1.
Figure 3:
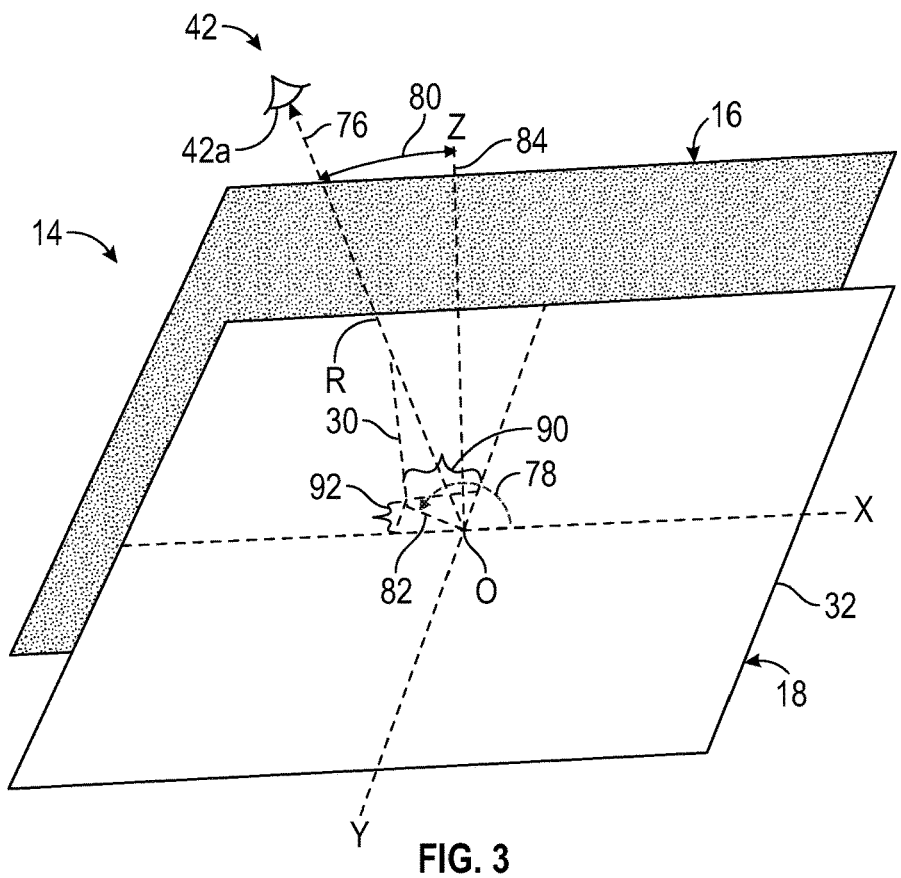
FIG. 3 is a schematic perspective fragmentary view of a touch sensitive area in the display console of FIG. 1.

Referring to the drawings, wherein like reference numbers refer to like components, FIGS. 1-3 schematically illustrates a display assembly 10. Referring to FIG. 1, the display assembly may be part of a device 12. The device 12 may be a mobile platform, such as, but not limited to, standard passenger car, sport utility vehicle, light truck, heavy duty vehicle, ATV, minivan, bus, transit vehicle, bicycle, robot, farm implement, sports-related equipment, boat, plane, train or any other transportation device. The device 12 may take many different forms and include multiple and/or alternate components and facilities. Referring to FIG. 1, the assembly 10 includes a display console 14. Referring to FIG. 1, the display console 14 may be positioned at various locations of the device 12, such as first, second and third locations 14a, 14b, 14c. In this embodiment, the display console 14 has a substantially planar profile.

FIG. 2 shows a schematic fragmentary partly-sectional view of the display console 14. Referring to FIG. 2, the display console 14 may include an image plane 16 and a touch plane 18. The touch plane 18 may be taken to be the outermost layer of a touch control stack 20. The touch control stack 20 may include a cover lens layer 22 and an active material substrate 24. Referring to FIG. 2, the image plane 16 may be construed to be centered between a color filter substrate 26 and a thin-film transistor substrate 28. Alternatively, the image plane 16 may be taken to be the same plane as the color filter substrate 26 or the thin-film transistor substrate 28. The touch plane 18 is spaced a separation distance 30 from the image plane 16. The display console 14 may employ a liquid crystal or any other display technology known to those skilled in the art.

Referring to FIG. 1, the display console 14 includes one or more touch sensitive areas, such as first touch sensitive area 32 and second touch sensitive area 33, in the touch plane 18. The first and second touch sensitive areas 32, 33 are divided into a respective plurality of pixels 34, 35. Referring to FIG. 1, the device 12 may include a steering wheel 36, driver seat 38 and passenger seat 40. Referring to FIG. 2, the display console may be visible to a plurality of users, including a first user 42 and a second user 44. The first and second users 42, 44 may touch the touch sensitive areas 32, 33 to activate an application or perform a selection. In one embodiment, the first user 42 may be seated in the driver seat 38 and the second user 44 may be seated in the passenger seat 20. Referring to FIG. 1, the first and second users 42, 44 are characterized by first and second eye reference points 42a and 44a. While two users are described herein, it is to be understood that the display console 14 may be visible to an unlimited number of users.

Referring to FIG. 1, the assembly 10 may include a camera 46 operatively connected to the controller and configured to obtain movement data of one or both of the first and second users. The assembly 10 may include driver and passenger seat position sensors 48, 50 (see FIG. 1) operatively connected to the driver seat 38 and passenger seat 40, respectively. Referring to FIGS. 1-2, the assembly 10 may include a proximity sensing system 52.

Referring to FIGS. 1-2, the proximity sensing system 52 may be both user-specific and touch sensitive area-specific. For example, referring to FIG. 2, the proximity sensing system 52 may include a first sensor 52a configured to detect when one of the first user 42 and the second user 44 is at least partially (i.e., any portion of the user, such as their finger) within a first predefined distance 54a of the first touch sensitive area 32. The first sensor 52a may be configured to emit a first outgoing beam 55a towards the first touch sensitive area 32 and receive a first return signal. The proximity sensing system 52 may include a second sensor 52b configured to detect when the other of the first user 42 and the second user 44 is at least partially (i.e., any portion of the user, such as their finger) within a second predefined distance 54b of the second touch sensitive area 33. The second sensor 52b may be configured to emit a second outgoing beam 55b towards the second touch sensitive area 33 and receive a second return signal. In one embodiment, the first and second outgoing beams 55a, 55b include electromagnetic radiation, such as infrared radiation. In another embodiment, the first and second outgoing beams 55a, 55b are high frequency sound waves. The controller 70 may be configured to analyze changes in the first and second return signals.

FIG. 3 shows a schematic perspective fragmentary view of the first touch sensitive area 32 (or second touch sensitive area 33) in the touch plane 18. Referring to FIG. 3, the touch plane 18 defines an origin (O), an x-axis (X), a y-axis (Y) and a z-axis (Z). A number of issues, including parallax, movement of the first and second users 42, 44, display curvature, rotation of the display console 14 about a rotation axis, may cause misalignment of the first touch sensitive area 32 as sensed by the touch plane 18 and as viewed by the first user 42 and the second user 44.

Referring to FIG. 1, a controller 70 is operatively connected to the display console 14 and various other components of the assembly 10. The proximity sensing system 52 may be linked to the driver and passenger seat position sensors 48, 50, via the controller 70. The controller 70 includes at least one processor 72 and at least one memory 74 (or any non-transitory, tangible computer readable storage medium) on which are recorded instructions for executing method 200, shown in FIG. 4, for dynamically adjusting the first touch sensitive area 32 in real-time to compensate for misalignment issues. The memory 74 can store controller-executable instruction sets, and the processor 72 can execute the controller-executable instruction sets stored in the memory 74. The controller 70 of FIG. 1 is specifically programmed to execute the steps of the method 100 (as discussed in detail below with respect to FIG. 4).

Figure 5:
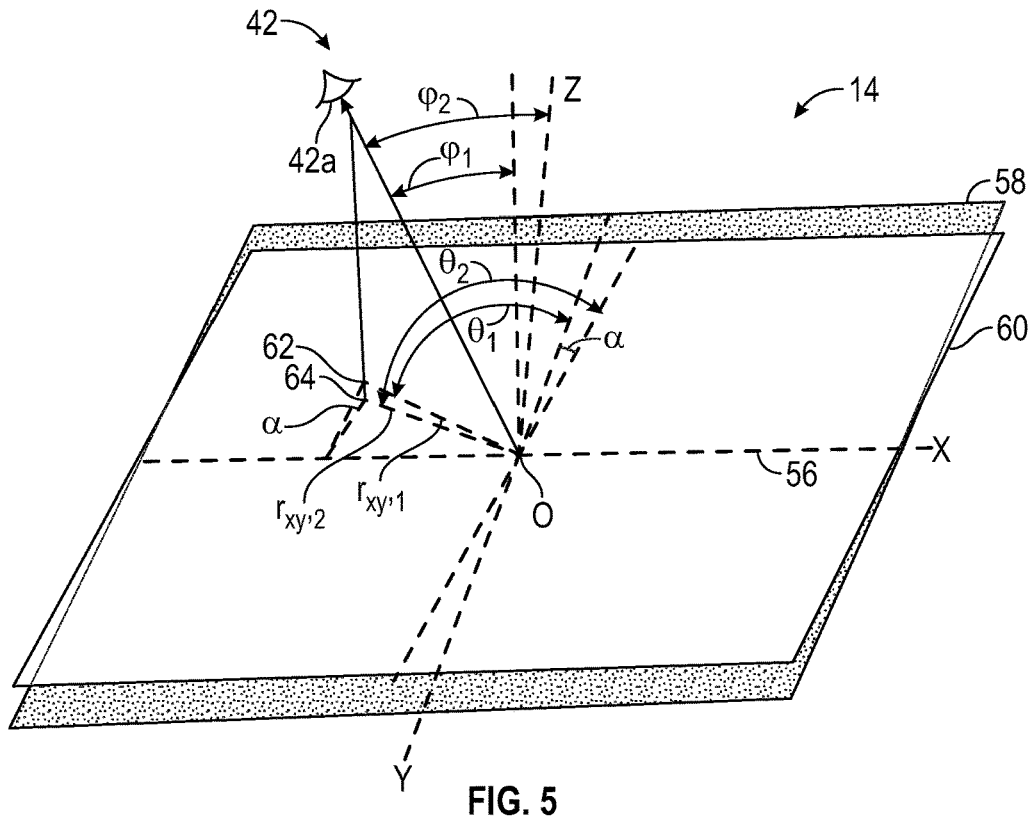
FIG. 5 is a schematic perspective fragmentary view of the display console of FIG. 1, in a rotated and un-rotated position.

Referring to FIG. 5, the display console 14 may be rotated a tilt angle ($\alpha$) about a rotation axis 56. FIG. 5 shows the display console 14 in an un-rotated position 58 and a rotated position 60. The display console 14 may be rotated a tilt angle ($\alpha$) such that an original position 62 ($x_1$, $y_1$) on the image plane is rotated to a modified position 64 ($x_2$, $y_2$) relative to the origin (O).

Figure 4:
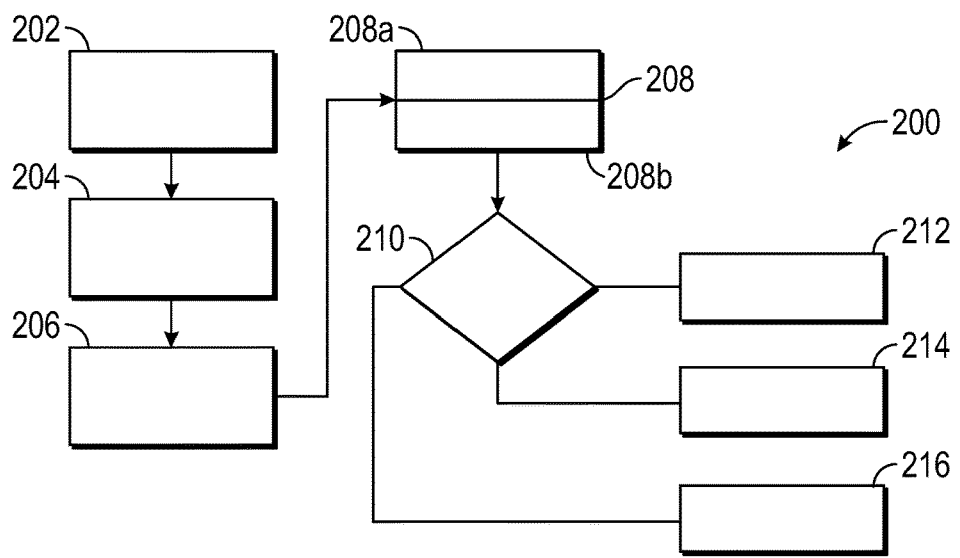
FIG. 4 is a flowchart of a method stored on and executable by the controller of FIG. 1.

Referring now to FIG. 4, a flowchart of the method 200 stored on and executable by the controller 70 of FIG. 1 is shown. Method 200 need not be applied in the specific order recited herein. Furthermore, it is to be understood that some steps may be eliminated. While the steps below are described with respect to the first user 42 and second user 44, they may be repeated for any additional users.

Referring to FIGS. 3-4, method 200 may begin with block 202, where the controller 70 is programmed or configured to obtain a viewing reference vector 76 (R), a first angle 78 (θ) and a second angle 80 (φ) for the first user 42. Referring to FIG. 3, the viewing reference vector 76 (R) extends between the origin (O) and the first eye reference point 42a. Referring to FIG. 3, the first angle 78 (θ) is an angle between the x-axis and an x-y projection vector 82 ($r_{xy}$). The x-y projection vector 82 ($r_{xy}$) is a projection of the viewing reference vector (R) on to the x-y plane. Referring to FIG. 3, the second angle 80 (φ) is an angle between a normal vector 84 (perpendicular to the display console 14) and the viewing reference vector (R). Here, $r_{xy}=r*[cosine(90-φ)]$; $x=r_{xy}*[cosine(180-θ)]$; and $y=r_{xy}*[sine(180-θ)]$.

In one embodiment, the viewing reference vector (R), the first angle (θ) and the second angle (φ) are based at least partially on data from the camera 46 of FIG. 1. The camera 46 is operatively connected to the controller 70 and configured to obtain the location of the first and second eye reference points 42a, 44a. The viewing reference vector (R) (and the first angle (θ) and the second angle (φ)) of the first user 42 and the second user 44 may be obtained based on the first and second seat position sensors 48, 50, respectively.

In block 204 of FIG. 4, the controller 70 is programmed to obtain a viewing reference vector (R), a first angle (θ) and a second angle (φ) for the second user 44. This is similar to block 202 in all respects, except that the viewing reference vector (R) extends between the origin (O) and the second eye reference point 44a, instead of between the origin (O) and the first eye reference point 42a.

In block 206 of FIG. 4, the controller 70 is programmed to determine if the display console is rotated and obtain a modified first angle ($θ_2$) and a modified second angle ($φ_2$) to compensate for a non-zero tilt angle. The un-rotated or original position 62 is characterized by an original first angle ($θ_1$), an original second angle ($φ_1$) and an original projection ($r_{xy,1}$). The modified first angle ($θ_2$) is based at least partially on a modified projection ($r_{xy,2}$) and a radial distance (r) between the origin and the first eye reference point of the first user 42. The modified second angle ($φ_2$) is based at least partially on a modified projection ($r_{xy,2}$) and a modified y coordinate ($y_2$). The modified y-coordinate ($y_2$) is a function of the original position ($x_1$, $y_1$) and the tilt angle (α), such that $y_2=(y_1*cosine(α))$. In the embodiment shown, the x-coordinate remains the same such that $x_1=x_2$. Here, $r_{xy,2}=r[cosine(90-φ)]$; $x_1=r_{xy}[cosine(180-θ)]$; and $y_1=r_{xy}*[sine(180-θ)]$. The modified projection ($r_{xy,2}$) is a function of the original position ($x_1$, $y_1$) and the tilt angle (α), such that $r_{xy,2}=(x_2+y_2)^{0.5}$. The modified first angle ($θ_2$) and modified second angle ($φ_2$) may be defined as:

$$θ_2=[90-(cosine^{-1}(r_{xy,2}/r))].$$

$$φ_2=[180-(sine^{-1}(y_2/(r_{xy,2})))].$$

The method 200 proceeds to block 208, which includes sub-blocks 208A and 208B. In sub-block 208A of FIG. 4, the controller 70 is programmed to obtain a correction matrix ($x_{pixel}$, $y_{pixel}$, $x_{pixel}$ offset, $y_{pixel}$ offset) based on the eye reference point 42a of the first user 42, for each pixel ($x_{pixel}$, $y_{pixel}$) in the plurality of pixels 34 of the first touch sensitive area 32.

In sub-block 208B of FIG. 4, the controller 70 is programmed to obtain a correction matrix ($x_{pixel}$, $y_{pixel}$, $x_{pixel}$ offset, $y_{pixel}$ offset) for the second user 44, for each pixel ($x_{pixel}$, $y_{pixel}$) in the plurality of pixels 34 of the first touch sensitive area 32.

Each pixel ($x_{pixel}$, $y_{pixel}$) is translated in the x-y plane by the off-set values ($x_{pixel}$ offset, $y_{pixel}$ offset). The off-set values ($x_{pixel}$ offset, $y_{pixel}$ offset) are based at least partially on the viewing reference vector (R) between the origin and the eye reference point of the first (or second) user, the first angle (θ) and the second angle (φ). The first and second correction matrices ($x_{pixel}$, $y_{pixel}$, $x_{pixel}$ offset, $y_{pixel}$ offset) be continuously updated on the basis of camera capture of the respective eye reference points 42a, 44a.

Referring to FIG. 3, the x-component 90 of the off-set values ($x_{pixel}$ offset, $y_{pixel}$ offset) is defined as:

$$x_{pixel} \text{offset} = z_1*[cosine(90-φ)*cosine(180-θ)]/[cosine(φ)].$$

Referring to FIG. 3, the y-component 92 of the off-set values ($x_{pixel}$ offset, $y_{pixel}$ offset) is defined as:

$$y_{pixel} \text{offset} = z_1*[cosine(90-φ)*sine(180-θ)]/[cosine(φ)].$$

In block 210 of FIG. 4, the controller 70 is programmed to determine if the proximity sensing system 52 has detected the first user 42 or the second user 44 or both. In block 210 of FIG. 4, if the proximity sensing system 52 indicates that the first user 42 is within the first predefined distance 54a of the first touch sensitive area 32, the method proceeds to block 212. In block 212, the collection of data (e.g., via camera) for the first user 42 is halted and the correction matrix (from sub-block 208A) is applied based on the eye reference point 42a of the first user 42 to obtain a new touch area target. In other words, the first plurality of pixels 34 of the first touch sensitive area is shifted or off-set by the correction matrix.

In block 210 of FIG. 4, f the proximity sensing system 52 indicates that the second user 44 is within the first predefined distance 54a of the first touch sensitive area 32, the method 200 proceeds to block 214. In block 214, the correction matrix (from sub-block 208B) is applied based on the eye reference point 44a of the second user 44 to obtain a new touch area target.

Additionally, in block 210 of FIG. 4, if the proximity sensing system 52 indicates that one of the first and second users 42, 44 is within the first predefined distance 54a of the first touch sensitive area 32 and the other of the first and second users 42, 44 is within the second predefined distance 54b of the second touch sensitive area 33, the method proceeds to block 216.

In block 216, the controller 70 is programmed to obtain and apply simultaneously two correction matrices, one for the plurality of pixels 34 of the first touch sensitive area 32 and another for the plurality of pixels 35 of the second touch sensitive area 33. The first correction matrix ($x_{pixel}$, $y_{pixel}$, $x_{pixel}$ offset, $y_{pixel}$ offset) is based on the eye reference point of the user (first or second users 42, 44) that is within a first predefined distance 54a of the first touch sensitive area 32. The second correction matrix ($x_{pixel}$, $y_{pixel}$, $x_{pixel}$ offset, $y_{pixel}$ offset) is based on the eye reference point of the user (first or second users 42, 44) that is within the second predefined distance 54b of the second touch sensitive area 33. Stated differently, the controller 70 is programmed to simultaneously dynamically Referring now to FIG. 6, a display console 314, in accordance with an alternative embodiment, is shown. In this embodiment, the display console 314 has a curved profile 316. The method 200 may be similarly applied to this embodiment, with the controller 70 being programmed to obtain off-set values ($x_{pixel}$ offset, $y_{pixel}$ offset) for touch sensitive area in the display console 314. The off-set values ($x_{pixel}$ offset, $y_{pixel}$ offset) are based at least partially on the separation distance ($z_1$), a viewing reference vector (R) between the origin and the eye reference point of the first (or second) user, a first angle (θ) and a second angle (φ).

Figure 6:
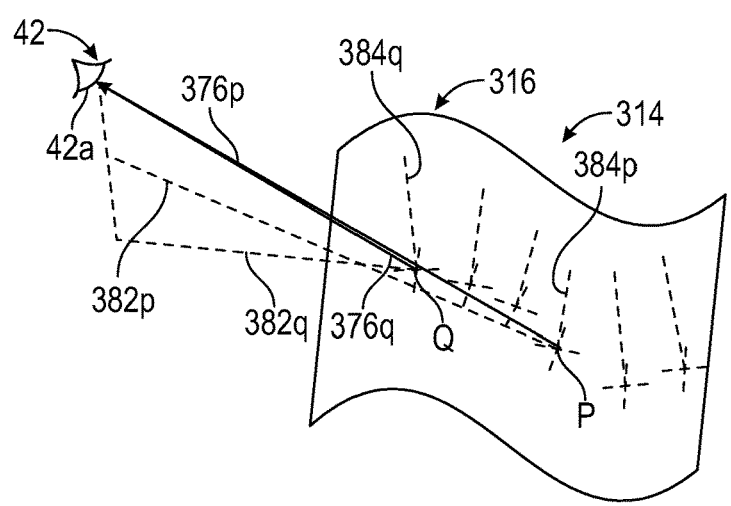
FIG. 6 is a schematic perspective fragmentary view of a display console, in accordance with another embodiment of the disclosure.

Referring to FIG. 6, two points P and Q on the curved profile 316 are shown. Similar to the previous embodiment, for point P, the second angle (φ) is between a normal vector 384p (perpendicular to the display console 314) and a viewing reference vector 376p. For point Q, the second angle (φ) is between a normal vector 384q (perpendicular to the display console 314) and a viewing reference vector 376q.

The difference in this embodiment is the definition of the first angle (θ). For point P, the first angle (θ) is between the x-axis and a tangent vector 382p (T). The tangent vector 382p is a projection of the viewing reference vector 376p on a plane that is tangent to the normal vector 384p. For point Q, the first angle (θ) is between the x-axis and a tangent vector 382q. The tangent vector 382q is a projection of the viewing reference vector 376q on a plane that is tangent to the normal vector 384q. Similar to the first embodiment, the parameters may be based at least partially on data from the camera 46 or the first and second seat position sensors 48, 50.

The controller 70 (and execution of the method 200) improves the functioning of the device 12 by improving accuracy of user interaction and compensating for multiple issues that cause touch input errors on both flat and curved displays. The controller 70 of FIG. 1 may be an integral portion of, or a separate module operatively connected to, other controller of the device 12.

The controller 70 includes a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A display assembly comprising:
a display console having an image plane and a touch plane, the touch plane defining a coordinate system with an origin, an x-axis, a y-axis and a z-axis and being spaced a separation distance ($z_1$) from the image plane;
wherein the touch plane includes at least one touch sensitive area;
a controller operatively connected to the display console, the controller including a processor and tangible, non-transitory memory on which is recorded instructions for executing a method of dynamically adjusting the at least one touch sensitive area in real-time;
wherein the at least one touch sensitive area includes a first touch sensitive area divided into a first plurality of pixels;
wherein execution of the instructions by the processor causes the controller to determine respective correction shifts to each of the first plurality of pixels of the first touch sensitive area for multiple viewing positions of the at least one user;
wherein the controller is programmed to obtain a correction matrix [$x_{pixel}$, $y_{pixel}$, $x_{pixel}$ offset, $y_{pixel}$ offset] such that each of the first plurality of pixels ($x_{pixel}$, $y_{pixel}$) is translated in an x-y plane by off-set values ($x_{pixel}$ offset, $y_{pixel}$ offset), the off-set values ($x_{pixel}$ offset, $y_{pixel}$ offset) being based at least partially on the separation distance ($z_1$), a viewing reference vector (R) between the origin and a first eye reference point of the first user, a first angle (θ) and a second angle (φ);
wherein the display console is configured to be rotated a tilt angle (α) about a rotation axis such that an original position ($x_1$, $y_1$) on the touch plane is rotated to a modified position ($x_2$, $y_2$), an x-coordinate ($x_2$) of the modified position being unchanged ($x_1$=$x_2$) and a y-coordinate ($y_2$) of the modified position ($x_2$, $y_2$) being defined as $y_2$=($y_1$*cosine (α));
wherein the controller is programmed to obtain a modified first angle ($θ_2$) and a modified second angle ($φ_2$) to compensate for the tilt angle (α);
wherein the modified first angle ($θ_2$) is based at least partially on a modified projection ($r_{xy,2}$) and a radial distance (r) between the origin and the eye reference point of the first user, the modified first angle ($\theta_2$) being defined as [90−(cosine$^{-1}$ ($r_{xy,2}$/r))];

wherein the modified second angle ($\varphi_2$) is based at least partially on a modified projection ($r_{xy,2}$) and a modified y coordinate ($y_2$), the modified second angle ($\varphi_2$) being defined as [180−(sine$^{-1}$ ($y_2$/($r_{xy,2}$)))];

wherein the modified projection ($r_{xy,2}$) is a function of the original position ($x_1$, $y_1$) and the tilt angle ($\alpha$), such that $r_{xy,2}=(x_2+y_2)^{0.5}$.

2. The assembly of claim 1, wherein the at least one user includes a first user and a second user, and further comprising:

a proximity sensing system operatively connected to the controller and including a first sensor;

wherein the first sensor is configured to detect when one of the first user and the second user is at least partially within a first predefined distance of the first touch sensitive area; and if the first sensor detects the first user being at least partially within the first predefined distance of the first touch sensitive area at a time j, then the controller is programmed to apply the respective correction shifts to each of the first plurality of pixels for a viewing position of the first user at the time j.

3. The assembly of claim 2, wherein:

if the first sensor detects the second user being at least partially within the first predefined distance of the first touch sensitive area at a time k, then the controller is programmed to apply the respective correction shifts to each of the first plurality of pixels for a viewing position of the second user at the time k.

4. The assembly of claim 2, wherein:

the at least one touch sensitive area includes a second touch sensitive area divided into a second plurality of pixels;

the proximity sensing system further includes a second sensor configured to detect when another of the first user and the second user is at least partially within a second predefined distance of the second touch sensitive area.

5. The assembly of claim 4, wherein:

if the first sensor indicates the one of the first user and the second user is at least partially within the first predefined distance of the first touch sensitive area at a time m and the second sensor indicates the another of the first user and the second user is at least partially within the second predefined distance of the second touch sensitive area at the time m, then the controller is programmed to apply simultaneously a first and a second correction shift at the time m; and the first correction shift is applied to the first plurality of pixels of the first touch sensitive area for the viewing position of the first user at the time m and second correction shift is applied to the second plurality of pixels of the second touch sensitive area for the viewing position of the second user at the time m.

6. The assembly of claim 1, wherein:

the first angle ($\theta$) is between the x-axis and an x-y projection vector ($r_{xy}$), the x-y projection vector ($r_{xy}$) being a projection of the viewing reference vector (R) on the x-y plane); and the second angle ($\varphi$) is between a normal vector perpendicular to the display console and the viewing reference vector (R).

7. The assembly of claim 1, wherein:

the first angle ($\theta$) is between the x-axis and a tangent vector, the tangent vector being a projection of the viewing reference vector (R) on a plane that is tangent to the normal vector;

the display console has a curved profile; and the second angle ($\varphi$) is between a normal vector perpendicular to the display console and the viewing reference vector (R).

8. The assembly of claim 1, further comprising:

a seat position sensor operatively connected to the controller and configured to detect a seat position of the first user; and wherein the viewing reference vector (R), the first angle ($\theta$) and the second angle ($\varphi$) are based at least partially on the seat position sensor.

9. The assembly of claim 1, further comprising:

a camera operatively connected to the controller and configured to obtain the first eye reference point in real-time;

wherein the viewing reference vector (R), the first angle ($\theta$) and the second angle ($\varphi$) are dynamically adjusted based at least partially on the first eye reference point in real-time.

10. The assembly of claim 1:

wherein an x-component of the off-set values ($x_{pixel}$ offset, $y_{pixel}$ offset) is defined as $x_{pixel}$ offset=$z_1$*[cosine (90−$\varphi$)*cosine (180−$\theta$)]/[cosine ($\varphi$)]; and wherein a y-component of the off-set values ($x_{pixel}$ offset, $y_{pixel}$ offset) is defined as $y_{pixel}$ offset=$z_1$*[cosine (90−$\varphi$)*sine (180−$\theta$)]/[cosine ($\varphi$)].

11. A method of dynamically adjusting at least one touch sensitive area in real-time in a display assembly, the display assembly including a proximity sensing system and a display console each operatively connected to a controller, the display console having an image plane and a touch plane spaced a separation distance ($z_1$) from the image plane, the at least one touch sensitive area being on the touch plane and divided into a first plurality of pixels, the method comprising:

determining respective correction shifts to each of the first plurality of pixels for variable viewing positions of a first user, via the controller;

obtaining a correction matrix [$x_{pixel}$, $y_{pixel}$, $x_{pixel}$ offset, $y_{pixel}$ offset] such that each of the first plurality of pixels ($x_{pixel}$, $y_{pixel}$) is translated in an x-y plane by off-set values ($x_{pixel}$ offset, $y_{pixel}$ offset), the off-set values ($x_{pixel}$ offset, $y_{pixel}$ offset) being based at least partially on the separation distance ($z_1$), a viewing reference vector (R) between the origin and a first eye reference point of the first user, a first angle ($\theta$) and a second angle ($\varphi$), via the controller;

configuring the display console to be rotated a tilt angle ($\alpha$) about a rotation axis such that an original position ($x_1$, $y_1$) on the touch plane is rotated to a modified position ($x_2$, $y_2$), an x-coordinate ($x_2$) of the modified position being unchanged ($x_1=x_2$) and a y-coordinate ($y_2$) of the modified position ($x_2$, $y_2$) being defined as $y_2=(y_1$*cosine ($\alpha$));

obtaining a modified first angle ($\theta_2$) and a modified second angle ($\varphi_2$) to compensate for the tilt angle ($\alpha$), via the controller, including:

determining a modified projection ($r_{xy,2}$) as a function of the original position ($x_1$, $y_1$) and the tilt angle ($\alpha$), such that $r_{xy,2}=(x_2+y_2)^{0.5}$;

determining the modified first angle ($\theta_2$) based at least partially on the modified projection ($r_{xy,2}$) and a radial distance (r) between the origin and the eye reference point of the first user such that $\theta_2=[90-(\text{cosine}^{-1}\ (r_{xy,2}/r))]$; and determining the modified second angle ($\varphi_2$) is based at least partially on a modified projection ($r_{xy,2}$) and a modified y coordinate ($y_2$), the modified second angle ($\varphi_2$) being defined as $[180-(\text{sine}^{-1}\ (y_2/(r_{xy,2})))]$;

detecting when one of the first user and a second user is at least partially within a first predefined distance of the first touch sensitive area via a first sensor in the proximity sensing system; and if the first sensor detects the first user being at least partially within the first predefined distance of the first touch sensitive area at a time j, then applying the respective correction shifts to each of the first plurality of pixels for the viewing position of the first user at the time j, via the controller.

12. The method of claim 11, further comprising:

determining respective correction shifts to each of the first plurality of pixels for variable viewing positions of the second user, via the controller;

if the first sensor detects the second user being at least partially within the first predefined distance of the first touch sensitive area at a time k, then the controller is programmed to apply the respective correction shifts to each of the first plurality of pixels for the viewing position of the second user at the time k.

13. The method of claim 11, wherein the at least one touch sensitive area includes a second touch sensitive area divided into a second plurality of pixels and further comprising:

detecting when another of the first user and the second user is at least partially within a second predefined distance of the second touch sensitive area, via the second sensor in the proximity sensing system;

if the first sensor indicates the one of the first user and the second user is at least partially within the first predefined distance of the first touch sensitive area at a time m and the second sensor indicates the another of the first user and the second user is at least partially within the second predefined distance of the second touch sensitive area at the time m, then applying simultaneously a first and a second correction shift at the time m, via the controller, such that the first correction shift is applied to the first plurality of pixels of the first touch sensitive area for the viewing position of the first user at the time m and the second correction shift is applied to the second plurality of pixels of the second touch sensitive area for the viewing position of the second user at the time m.

14. The method of claim 11, wherein:

the first angle ($\theta$) is between the x-axis and an x-y projection vector ($r_{xy}$), the x-y projection vector ($r_{xy}$) being a projection of the viewing reference vector (R) on the x-y plane); and the second angle ($\varphi$) is between a normal vector perpendicular to the display console and the viewing reference vector (R).

15. The method of claim 11, wherein:

the first angle ($\theta$) is between the x-axis and a tangent vector, the tangent vector being a projection of the viewing reference vector (R) on a plane that is tangent to the normal vector;

the display console has a curved profile; and the second angle ($\varphi$) is between a normal vector perpendicular to the display console and the viewing reference vector (R).

16. A display assembly comprising:

a display console having an image plane and a touch plane, the touch plane defining a coordinate system with an origin, an x-axis, a y-axis and a z-axis and being spaced a separation distance ($z_1$) from the image plane;

wherein the display console has a curved profile and the touch plane includes at least one touch sensitive area;

a controller operatively connected to the display console, the controller including a processor and tangible, non-transitory memory on which is recorded instructions for executing a method of dynamically adjusting the at least one touch sensitive area in real-time;

wherein the at least one touch sensitive area includes a first touch sensitive area divided into a first plurality of pixels;

wherein execution of the instructions by the processor causes the controller to determine respective correction shifts to each of the first plurality of pixels of the first touch sensitive area for multiple viewing positions of the at least one user, including obtaining a correction matrix [$x_{pixel}$, $y_{pixel}$, $x_{pixel}$ offset, $y_{pixel}$ offset] such that each of the first plurality of pixels ($x_{pixel}$, $y_{pixel}$) is translated in an x-y plane by off-set values ($x_{pixel}$ offset, $y_{pixel}$ offset);

wherein the off-set values ($x_{pixel}$ offset, $y_{pixel}$ offset) are based at least partially on the separation distance ($z_1$), a viewing reference vector (R) between the origin and a first eye reference point of the first user, a first angle ($\theta$) and a second angle ($\varphi$);

wherein the first angle ($\theta$) is between the x-axis and a tangent vector, the tangent vector being a projection of the viewing reference vector (R) on a plane that is tangent to the normal vector;

wherein the second angle ($\varphi$) is between a normal vector perpendicular to the display console and the viewing reference vector (R);

wherein the display console is configured to be rotated a tilt angle ($\alpha$) about a rotation axis such that an original position ($x_1$, $y_1$) on the touch plane is rotated to a modified position ($x_2$, $y_2$) relative to the origin;

wherein a y-coordinate ($y_2$) of the modified position ($x_2$, $y_2$) is a function of the original position ($x_1$, $y_1$) and the tilt angle ($\alpha$), such that $y_2=(y_1*\text{cosine}\ (\alpha))$ and an x-coordinate ($x_2$) of the modified position is unchanged ($x_1=x_2$);

wherein the controller is programmed to obtain a modified first angle ($\theta_2$) and a modified second angle ($\varphi_2$) to compensate for the tilt angle ($\alpha$);

wherein the modified first angle ($\theta$) is based at least partially on a modified projection ($r_{xy,2}$) and a radial distance (r) between the origin and the eye reference point of the first user, the modified first angle ($\theta_2$) being defined as $[90-(\text{cosine}^{-1}\ (r_{xy,2}/r))]$;

wherein the modified second angle ($\varphi_2$) is based at least partially on a modified projection ($r_{xy,2}$) and a modified y coordinate ($y_2$), the modified second angle ($\varphi_2$) being defined as $[180-(\text{sine}^{-1}\ (y_2/(r_{xy,2})))]$, and wherein the modified projection ($r_{xy,2}$) is a function of the original position ($x_1$, $y_1$) and the tilt angle ($\alpha$), such that $r_{xy,2}=(x_2+y_2)^{0.5}$.

* * * * *